Patented Aug. 4, 1953

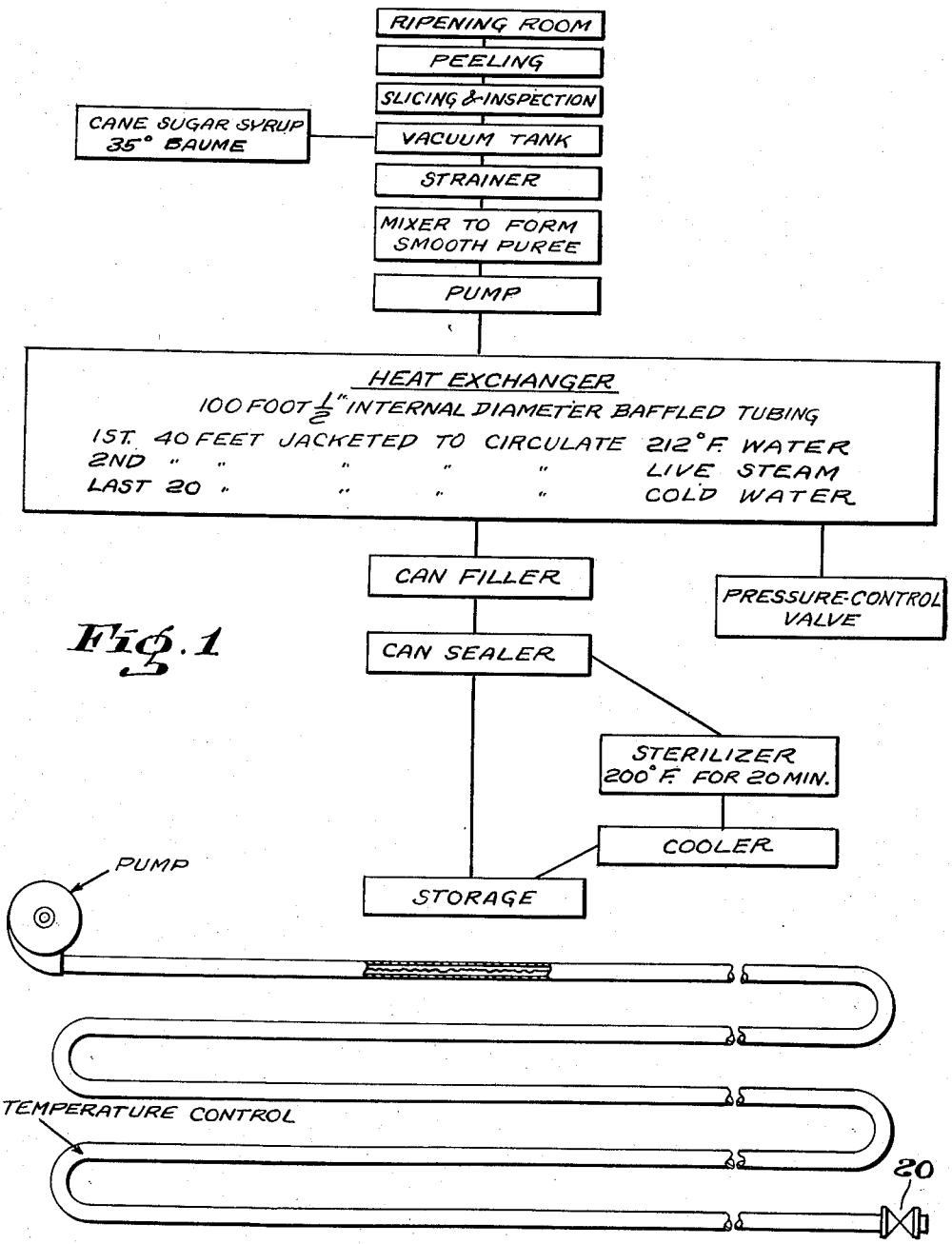

2,647,838

UNITED STATES PATENT OFFICE 2,647,838

PROCESS OF MAKING A BANANA PRODUCT

Roger T. Stone, San Jose, Costa Rica, assignor to Food Concentrates, Inc., New York, N. Y., a corporation of Delaware Application October 11, 1950, Serial No. 189,525
In Honduras February 3, 1950

4 Claims. (Cl. 99—154)

This invention relates to the processing of bananas and more particularly to a banana food product which, after storage in its processed form, retains a natural banana color, odor, flavor and chemical content.

The uninitiated would assume that the best way to approximate the color, flavor and texture of a ripe banana in a preservable banana product would be by processing ripe, as distinguished from unripe, fruit. Experience has shown, however, that when ripe bananas are subjected to conventional fruit or food processing involving standard sterilization temperatures, the bananas acquire an unnatural purple color, and a "cooked" flavor which is markedly unlike the taste of ripe fruit. Certain experimenters have, therefore, resorted to the use of unripe or only partially ripened fruit, but this requires artificial coloring and the huge addition of sugar which overpower the natural banana flavor. Such un-banana-like products result from the method proposed in the Foote Patent No. 2,507,564.

According to this invention, fully ripe bananas are successfully processed for preservation as a banana food product possessing no detrimental change in natural color or flavor, thus producing a storeable banana product having substantially the same chemical content of ripe banana and closely approaching ripe banana color, odor, texture and flavor.

The present process is based upon my discovery that processing sufficient to insure banana preservation and purity can be accomplished without cooking the banana to that extent which develops a dominating "cooked" taste. Moreover, I have discovered that these processing temperatures are below the range of temperatures which cause development of purple color. Accordingly, my entire process, while fully adequate to insure against spoilage or preservation of harmful bacteria, is conducted at temperatures below "cooked" taste and below purple-color developing temperatures.

My process has additional advantages, one of which is the avoidance in its preferred form, of frothing. Boiled bananas are frothy and, when packed warm as they must be to avoid "flippers," shrink as the pack cools, so that the can is only partially filled. In the preferred form of my process, precautions are taken to minimize frothing. When packed warm, my banana product does not shrink to any noticeable extent upon cooling, and provides a full can with conventional vacuum.

Because I pack warm, my sealed product, e. g. a pre-sterilized can, filled with my warm product and hermetically sealed, does not have to be submitted to additional sterilization, though such sterilization may be utilized as a safety measure if there is any question as to the sterility of the cans and provided the externally applied temperature is not so high as to detrimentally affect the packed banana product.

In addition, in my process, in order to produce a product that will not discolor upon exposure to air, I remove the gases which are responsible for such discoloration from the banana bulk in an initial processing stage before the banana is subjected to any heat treatment whatsoever.

The process of my invention is schematically illustrated in the flow sheet shown in Fig. 1 of the accompanying drawing.

After peeling and discarding skins, fully ripened choice bananas are mechanically sliced to permit inspection and discard of internally imperfect fruit. The sliced bananas are then covered with a liquid, e. g. commercial sugar syrup in the form of a white refined cane sugar syrup of 35° heavy Baumé. The receiving tank is equipped with suitable vacuum equipment to permit the syrup-covered banana slices to be submitted to an atmosphere of reduced pressure, preferably equivalent to 28–30" of mercury. The vacuum is desirably applied for five minutes, released and then applied momentarily twice again.

The purpose of the vacuum step is to remove gases in the banana product, which gases cause banana discoloration upon exposure to air. The repeated application of vacuum is helpful in creating a pump-like action which replaces such gases with liquid.

Excess liquid is next drained from the sliced bananas, preferably to an extent that the sugar content of the drained slices is not materially above that of the slices prior to addition of the sugar syrup, e. g. not more than 10% above the original sugar content. The drained bananas are then placed in a mechanical mixer which macerates them into a smooth puree. Up to this point, no heat has been applied to the bananas. The pureed bananas are then pumped, by means of a high-pressure, positive-action, non-agitating pump, through a heat exchanger at a rate of 1 gallon each 38 seconds.

The heat exchanger is diagrammatically shown in Fig. 2 of the drawings and may comprise, for example, 100 feet of ½ inch internal diameter stainless steel tubing, the first 40 feet of which are jacketed for circulation around the tube of boiling water. The next 40 feet are separately jacketed in the same manner for circulation of live steam, to permit precise controlling of the temperature, and the last 20 feet are separately jacketed for circulation of cooling water.

The entire tube contains a longitudinally extending internal strip baffle of irregular contour which acts under the influence of the pump to mix the puree continuously as it passes through the pipe to expose it more uniformly to the heat of the internal pipe surface and is radially of uniform temperature.

A valve 20 at the outlet of the pipe controls the pressure in the tube and suitable thermocouples and automatic temperature controllers are inserted through the pipe at intervals in order to control the temperature of the puree at critical points. With the positive-action pump the rate of puree flow is thus about 157 feet per minute in the one-half inch pipe.

From the heat exchanger, the puree passes successively, as indicated in the flow sheet of Fig. 1, to a can filling machine and to a can sealer, and then the cans may optionally go successively through a sterilizer and a cooler, after which the cans are ready for storage.

The temperatures from the heat exchanger on are as follows: By the time the puree reaches the end of the live steam jacket, it should preferably have attained a temperature of at least 158° F. and not more than 190° F., preferably about 175° F. At this preferred temperature, it is found that the product takes on a glossy, attractive appearance as it goes into the can, whereas at a lower or much higher temperature it does not have this appearance. Also, it contains no visible bubbles.

Because, at 175° F., there is some tendency for the product to froth, I maintain the product as it passes through the exchanger at a pressure above atmospheric by means of a pressure regulator valve as indicated in Fig. 1, e. g. at a pressure of 30 to 60# p. s. i. at the end of the first 80 feet to prevent boiling and control frothing. The exact pressure is regulated to produce in the sealed can an optimum full weight consistent with good canning practice. Thus, if the weight is too low, indicating a partially filled can due to frothing, the pressure is increased, until the weight becomes indicative of a full can.

Moreover, the pH of the puree decreases from an average of 4.85 to 4.90 going into the heat exchanger, being identical with that of whole ripe fruit, to from 4.65 to 4.75 as it goes to the can filling machine. While at this pH, a temperature of 158° F. has been found to produce a product sufficiently sterile to keep in a hermetically sealed can, use of 175° F. temperature provides a margin of safety as well as insures the better appearance previously mentioned.

The cold water at the end of the exchanger serves to bring the temperature down to a point more practical for the filling operation, for example, 140° F.

With the above procedure, the hermetically sealed can, if sterilized before filling, need not be further sterilized, but can if desired for safety reasons, be submitted to a temperature of 200° F. for 20 minutes to sterilize adequately the interior surface of the can without necessarily bringing the center of the contents to anywhere near 200° F.

If thus further sterilized, artificial cooling is resorted to after sterilization lest, upon stacking in the warehouse at the 200° F. outside temperature, cooling will take place so slowly as to affect the product. Preferably, the cooling step should bring the cans to about 100° F. Further cooling is liable to cause condensation on the cans with rusting.

For best results, enamel lined cans are utilized to prevent off-odor or off-flavor, which usually appears when plain tin cans are used, caused by a reaction which eventually exposes the black iron.

The main factor to which I attribute the success of my process is the apparent presence of some agent, unique in bananas, which I believe to be anti-biotic in character and responsible for destroying, or at least controlling adequately, growth of bacteria of the type which require the relatively higher sterilization temperatures in the case of all other food products of equivalent pH.

The reduction in pH which occurs during the heat exchanger treatment previously mentioned is undoubtedly helpful, it being a well known fact that the more acid the medium, the less heat treatment required to produce safe sterilization.

In any event, the temperature which I require is lower than the temperature which could safely be used with any other food product of equivalent pH. Because of this, the heretofore unavoidable "cooked" banana flavor and bad color caused by conventional sterilization procedures can be, and is, avoided in my process, and, when taken with the color stability upon exposure to the air resulting from the pre-removal of gases, results in the accomplishment of the objective of this invention in the production of a natural banana-flavored and banana-colored storeable ripe banana product having substantially the same chemical content and analysis of fresh ripe banana puree, and stable against deterioration and spoilage.

The term "banana" as used herein and in the appended claims connotes the edible fruit of the banana plant and of other plants of the same family which bear edible fruit commonly referred to as "bananas."

I claim:

1. The method of making a storeable banana food product having substantially the flavor and color of ripe bananas comprising slicing peeled, ripe bananas, saturating the sliced bananas with a syrup, subjecting the saturated sliced bananas to reduced atmospheric pressure to remove gases, removing excess liquid from the de-gassed bananas, macerating the bananas to form a puree and then subjecting the puree to a temperature of 158°–190° F. at a pressure above atmospheric to control frothing of the bananas.

2. The method of making a storeable banana food product having substantially the flavor and color of ripe bananas comprising slicing peeled, ripe bananas, saturating the sliced bananas with a syrup, subjecting the saturated sliced bananas to reduced atmospheric pressure to remove gases, removing excess syrup from the de-gassed bananas, macerating the bananas to form a smooth puree and then subjecting the macerated bananas to a temperature of 158°–190° F. at a pressure above atmospheric to control frothing of the bananas, immediately cooling to about 140° F., and packaging the cooling product.

3. The method of making a storeable banana food product having substantially the flavor and color of ripe bananas comprising slicing peeled, ripe bananas, saturating the sliced bananas with a syrup, subjecting the saturated sliced bananas to reduced atmospheric pressure to remove gases, removing excess syrup from the de-gassed bananas, macerating the bananas to form a smooth puree, then subjecting the puree to a temperature of 158°–190° F. at a pressure sufficiently above atmospheric to prevent boiling of the puree, and packaging the puree in warm condition in a hermetically sealed container.

4. The method of making a storeable banana food product as claimed in claim 2, wherein the macerated bananas are subjected to the temperature of 158°–190° F. and subsequently cooled to the temperature of about 140° F. while the puree is being continuously and progressively moved along a path of restricted cross-sectional area.

ROGER T. STONE.

References Cited in the file of this patent

UNITED STATES PATENTS

| Number | Name | Date |
|---|---|---|
| 1,243,964 | Negrete | Oct. 23, 1917 |
| 1,890,475 | Todd | Dec. 13, 1932 |
| 1,906,295 | Wickenden | May 2, 1933 |
| 2,507,564 | Foote | May 16, 1950 |